B. & E. F. MORSE.
HORSE HAY-RAKE.
No. 190,892. Patented May 15, 1877.
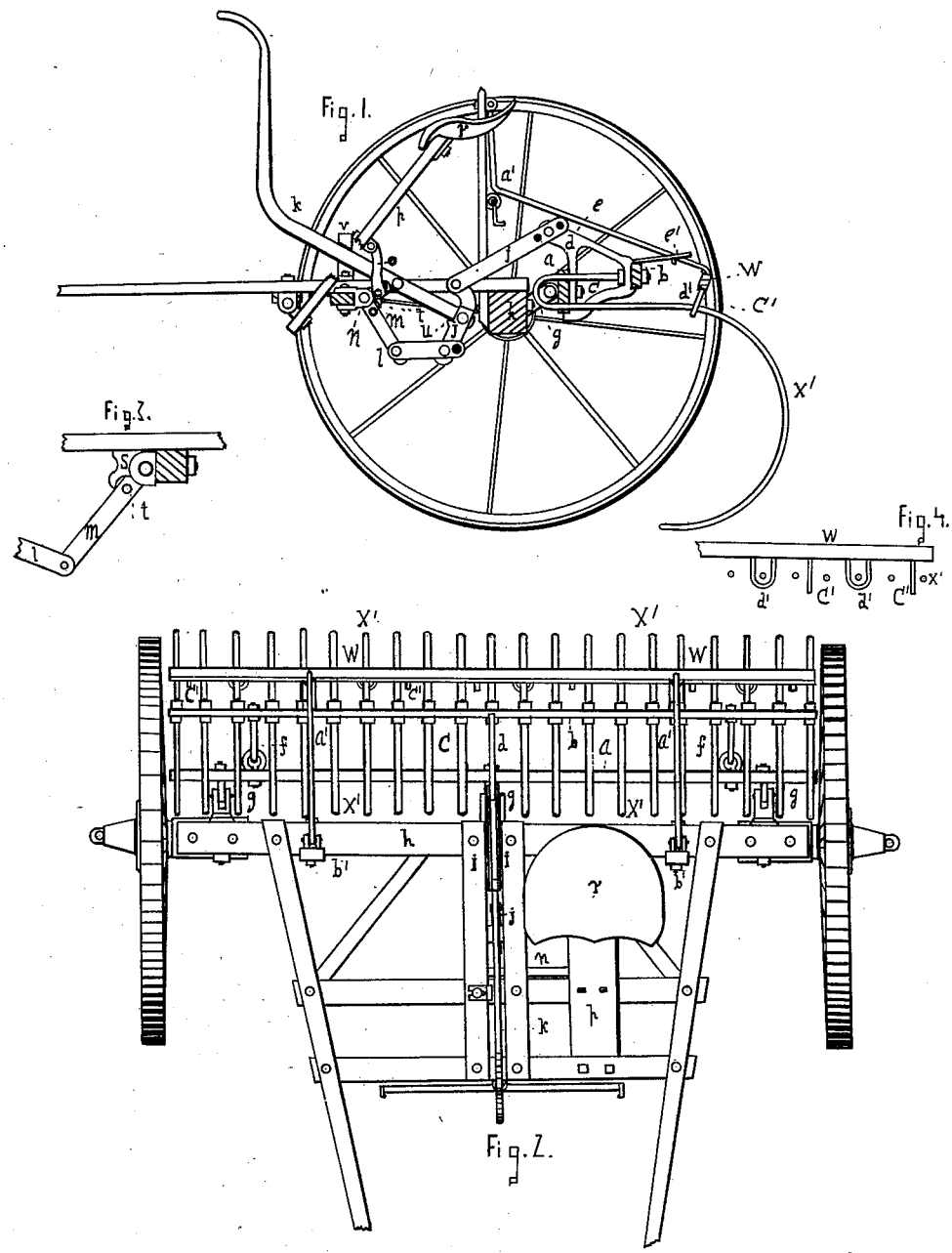

UNITED STATES PATENT OFFICE.

BEN MORSE AND EVERETT F. MORSE, OF ITHACA, NEW YORK.

IMPROVEMENT IN HORSE HAY-RAKES.

Specification forming part of Letters Patent No. 190,892, dated May 15, 1877; application filed October 24, 1876.

*To all whom it may concern:*

Be it known that we, BEN MORSE and EVERETT F. MORSE, of Ithaca, Tompkins county, New York, have invented an Improved Sulky-Rake, of which the following is a specification, reference being had to the accompanying drawings.

Figure 1 is a vertical sectional view of our rake. Fig. 2 is a horizontal view of the same. Figs. 3 and 4 are detail views.

Our invention relates to the shape of the teeth of a sulky-rake, to a rake-head for holding them, to a device for automatically adjusting the teeth to the ground when raking, and to a device for controlling the action of the cleaner-bar.

In the drawings, $a$ designates a bar, which is the main part of the rake-head, and it has transverse grooves cut in two of its opposite sides to receive and hold the teeth. Bar $b$ has holes in it to correspond with the grooves in bar $a$. These are to receive and hold the ends of the teeth. The upper portion of the teeth of our rake are recurved, so as to pass under and round and over bar $a$ in the grooves specified; thence back into bar $b$, which is placed over the body of the teeth, and far enough from them to allow the teeth to be sprung some distance to relieve themselves. The triangular casting $d$ has an arm, $e$, to which the power for controlling the teeth $c$ is applied. The rods $ff$ connect bars $a$ and $b$ near their ends, while casting $d$ connects them at or near their centers. The bars $a$ and $b$, thus connected, form our rake-head for holding the teeth and controlling their action.

The rake-head is connected to axle $h$ by hinges $g$. From the upper end of lever $j$, which lever is pivoted to the lower end of hand-lever $k$, straps $i$ connect to arm $e$; and $l$ are straps or connecting rod or rods, to connect the lower end of lever $j$ to arm $m$ on rock-shaft $n$. Another arm on this shaft is connected to lever-seat support $p$ by pitman $o$. Hangers $s$ hold the ends of shaft $u$, and $t$ is a stop on arm $m$, which meets a stop on hanger $s$, to limit the upward motion of arm $m$, so as to allow the teeth to be pressed down by the hand-lever $k$, should the seat-lever at any time fail to hold them in position. Stop $n$ on lever $j$ is to limit the forward motion of its lower end, and $v$ is a stop or catch to hold lever $k$ stationary while raking.

The operation of the parts thus far described is as follows: The rake-teeth being down, and the lever $k$ under catch $v$, as the rake is drawn forward to gather its load, the teeth are pressed backward and upward by the load and their contact with the ground and other obstacles. The surface raked being uneven, it will not answer to hold the teeth rigidly in one position. Their spring will relieve them to quite an extent; but they are still further relieved in the following manner: As the teeth are pressed up by passing over an obstacle or elevation in the ground, the hand-lever being made stationary, the upper end of lever $j$ is pressed forward and the lower end backward, and through the intermediate parts the seat and person on it are raised, and when the obstacle or elevation is passed the weight of the seat and person in it presses the teeth back to their original position. In this way, the hand-lever $k$ being under stop $v$, the weight of the seat and of the operator is made automatically to adjust the teeth to the ground in raking.

When we wish to dump the rake we press lever $k$ from under catch $v$ and raise it. As this is done the teeth go up and the seat and operator go down, and thus the weight of the seat and operator in it helps raise the teeth, while the same weight automatically adjusts them to the ground while raking. This two-fold action comes by making the hand-lever both movable and stationary, as has been described. And it is apparent that other power, as a spring, the draft of the horse, can be applied to lever $j$ in place of the seat, and the action of lever $j$, hand-lever $k$, catch $v$, be the same on the rake-teeth.

Our device for supporting cleaner-bar $w$, and regulating its motion, consists of rods $a'$ $a'$, to which it is rigidly attached, so as to move with them. These rods are hinged to standards $b'$ $b'$, and rest on arms $e'$ $e'$, which are rigidly fastened to bar $b$, so as to move with it and the teeth, when they are raised to discharge the load. Rods $a'$ $a'$ are so bent as to act as cams, and keep cleaner-bar $w$ the required distance above the teeth, the object being to lessen the resistance from friction and from the gathered load when the rake is dumped, and to allow free play of the teeth when raking, without allowing the hay woven in the teeth to pass the stops in it, and so that it will be carried back toward the points of the teeth and dropped from them with their load. The cleaner-bar is also allowed by this cam action to drop on the teeth when they are raised nearly to their highest point, the object being to jar from them any hay which may still be clinging to them.

It will be noticed that we make our rider-bar serve as a part of the rake-head, for we attach or make fast the upper ends of the teeth to it.

What we claim as our invention, and desire to secure by Letters Patent, is—

1. The combination of the grooved bar $a$, hinged in rear of the axle, the bar $b$, attached to the bar $a$, and the bent rake-teeth, said parts being arranged substantially as described.

2. The combination of lever $k$, stop or catch $v$, or its equivalent, and lever $j$, to which a power is applied for the purpose of automatically adjusting the teeth to the ground, and to assist in raising them, substantially as set forth.

3. The combination of stop $t$ on arm $m$ with stop or hanger $s$, substantially as and for the purpose specified.

4. The combination of stop $n$ on lever $j$ with lever $k$, for the purpose specified.

5. The combination of seat-lever $p$, lever $j$, lever $k$, and catch $v$, substantially as and for the purpose specified.

6. The bent rods $a'$ $a'$, rigidly attached to cleaner-bar $w$, and hinged to standards $b'$ $b'$, in combination with the movable arms $e'$ $e'$, as and for the purpose specified.

BEN MORSE.
EVERETT F. MORSE.

Witnesses:
S. J. PARKER,
A. M. LUCAS.